(12) United States Patent
Roderick et al.

(10) Patent No.: US 11,376,552 B2
(45) Date of Patent: Jul. 5, 2022

(54) PERMEATE FLOW PATERNS

(71) Applicant: Aqua Membranes Inc., Albuquerque, NM (US)

(72) Inventors: Kevin Roderick, Albuquerque, NM (US); Rodney Herrington, Albuquerque, NM (US); Kendall Weingardt, Albuquerque, NM (US)

(73) Assignee: Aqua Membranes Inc., Albuquerque, NM (US)

( * ) Notice: Subject to any disclaimer, the term of this patent is extended or adjusted under 35 U.S.C. 154(b) by 451 days.

(21) Appl. No.: 16/332,767

(22) PCT Filed: Sep. 18, 2017

(86) PCT No.: PCT/US2017/052116
§ 371 (c)(1),
(2) Date: Mar. 12, 2019

(87) PCT Pub. No.: WO2018/057474
PCT Pub. Date: Mar. 29, 2018

(65) Prior Publication Data
US 2019/0358590 A1  Nov. 28, 2019

Related U.S. Application Data

(60) Provisional application No. 62/397,142, filed on Sep. 20, 2016.

(51) Int. Cl.
*B01D 63/10* (2006.01)
*B01D 61/02* (2006.01)
*B01D 65/08* (2006.01)
*C02F 1/44* (2006.01)

(52) U.S. Cl.
CPC ........... *B01D 63/10* (2013.01); *B01D 61/025* (2013.01); *B01D 65/08* (2013.01); *C02F 1/441* (2013.01); *B01D 2311/06* (2013.01); *B01D 2313/146* (2013.01); *C02F 2301/02* (2013.01); *C02F 2301/024* (2013.01); *C02F 2301/028* (2013.01); *C02F 2301/04* (2013.01)

(58) Field of Classification Search
None
See application file for complete search history.

(56) References Cited

U.S. PATENT DOCUMENTS

| | | | |
|---|---|---|---|
| 2,889,932 | A | 9/1959 | Mackintosh |
| 3,962,096 | A | 6/1976 | Ishii |
| 3,963,621 | A | 6/1976 | Newman |
| 4,187,173 | A | 2/1980 | Keefer |
| 4,208,289 | A | 6/1980 | Bray |
| 4,222,874 | A | 9/1980 | Connelly |
| 4,228,014 | A | 10/1980 | Timm et al. |

(Continued)

FOREIGN PATENT DOCUMENTS

| | | | |
|---|---|---|---|
| CA | 2662925 | A1 | 1/2009 |
| CA | 2825674 | C | 8/2011 |

(Continued)

*Primary Examiner* — Clare M Perrin
(74) *Attorney, Agent, or Firm* — V Gerald Grafe

(57) ABSTRACT

Embodiments of the present invention provide the integration of arbitrary flow directing patterns, deposited or integrated on or into the porous permeate spacer in a spiral-wound membrane separation element.

4 Claims, 6 Drawing Sheets

(56) References Cited

U.S. PATENT DOCUMENTS

| | | |
|---|---|---|
| 4,230,564 A | 10/1980 | Keefer |
| 4,230,579 A | 10/1980 | Bray et al. |
| 4,235,723 A | 11/1980 | Bartlett, Jr. |
| 4,277,340 A | 7/1981 | Kanamaru et al. |
| 4,288,326 A | 9/1981 | Keefer |
| 4,309,287 A | 1/1982 | Roos et al. |
| 4,326,960 A | 4/1982 | Iwahori et al. |
| 4,341,631 A | 7/1982 | Hargitay |
| 4,347,132 A | 8/1982 | Davis |
| 4,354,939 A | 10/1982 | Pohl |
| 4,358,377 A | 11/1982 | Clark |
| 4,409,849 A | 10/1983 | Roos |
| 4,410,429 A | 10/1983 | Harvey et al. |
| 4,411,785 A | 10/1983 | Yu et al. |
| 4,426,285 A | 1/1984 | Davis |
| 4,434,056 A | 2/1984 | Keefer |
| 4,454,891 A | 6/1984 | Dreibelbis et al. |
| 4,461,707 A | 7/1984 | Thayer et al. |
| 4,476,022 A | 10/1984 | Doll |
| 4,482,459 A | 11/1984 | Shiver |
| 4,534,713 A | 8/1985 | Wanner |
| 4,556,488 A | 12/1985 | Timm et al. |
| 4,585,554 A | 4/1986 | Burrows |
| RE32,144 E | 5/1986 | Keefer |
| 4,595,497 A | 6/1986 | Burrows |
| 4,599,171 A | 7/1986 | Padilla et al. |
| 4,600,512 A | 7/1986 | Aid |
| 4,608,140 A | 8/1986 | Goldstein |
| 4,613,436 A | 9/1986 | Wight et al. |
| 4,623,451 A | 11/1986 | Oliver |
| 4,623,467 A | 11/1986 | Hamlin |
| 4,640,774 A | 2/1987 | Garcera et al. |
| 4,645,601 A | 2/1987 | Regunathan et al. |
| 4,652,373 A | 3/1987 | Trimmer |
| 4,657,674 A | 4/1987 | Burrows |
| 4,670,144 A | 6/1987 | McCausland et al. |
| 4,695,375 A | 9/1987 | Tyler |
| 4,704,324 A | 11/1987 | Davis et al. |
| 4,705,625 A | 11/1987 | Hart, Jr. |
| 4,735,716 A | 4/1988 | Petrucci et al. |
| 4,735,718 A | 4/1988 | Peters |
| 4,741,823 A | 5/1988 | Olsen et al. |
| 4,743,366 A | 5/1988 | Burrows |
| 4,744,895 A | 5/1988 | Gales et al. |
| 4,744,900 A | 5/1988 | Bratt |
| 4,756,835 A | 7/1988 | Wilson |
| 4,775,465 A | 10/1988 | Burrows |
| 4,781,831 A | 11/1988 | Goldsmith |
| 4,784,771 A | 11/1988 | Wathen et al. |
| 4,802,982 A * | 2/1989 | Lien ............... B01D 53/22 210/247 |
| 4,814,079 A | 3/1989 | Schneider |
| 4,820,413 A | 4/1989 | Lopez |
| 4,830,744 A | 5/1989 | Burrows |
| 4,832,850 A | 5/1989 | Cais et al. |
| 4,834,873 A | 5/1989 | Burrows |
| 4,834,881 A | 5/1989 | Sawada |
| 4,842,725 A | 6/1989 | Blad et al. |
| 4,844,805 A | 7/1989 | Solomon |
| 4,855,058 A | 8/1989 | Holland et al. |
| 4,856,559 A | 8/1989 | Lipshultz et al. |
| 4,861,487 A | 8/1989 | Fulk |
| 4,869,821 A | 9/1989 | Korin |
| 4,874,514 A | 10/1989 | Casey, Jr. |
| 4,876,002 A | 10/1989 | Marshall et al. |
| 4,877,521 A | 10/1989 | Petrucci et al. |
| 4,882,061 A | 11/1989 | Petrucci et al. |
| 4,882,223 A | 11/1989 | Aptel et al. |
| RE33,135 E | 12/1989 | Wanner, Sr. et al. |
| 4,885,092 A | 12/1989 | Zwick |
| 4,886,597 A | 12/1989 | Wild et al. |
| 4,892,657 A | 1/1990 | Mohn et al. |
| 4,902,417 A | 2/1990 | Lien |
| 4,906,372 A | 3/1990 | Hopkins |
| 4,917,847 A | 4/1990 | Solomon |
| 4,937,557 A | 6/1990 | Tucci et al. |
| 4,944,877 A | 7/1990 | Maples |
| 4,988,525 A | 1/1991 | Gresch |
| 4,990,248 A | 2/1991 | Brown et al. |
| 4,992,170 A | 2/1991 | Menon et al. |
| 4,995,977 A | 2/1991 | Hilgendorff et al. |
| 5,002,664 A | 3/1991 | Clack et al. |
| 5,017,284 A | 5/1991 | Miler et al. |
| 5,043,066 A | 8/1991 | Miller et al. |
| 5,045,197 A | 9/1991 | Burrows |
| 5,057,212 A | 10/1991 | Burrows |
| 5,069,789 A | 12/1991 | Mohn et al. |
| 5,078,876 A | 1/1992 | Whittier et al. |
| 5,094,749 A | 3/1992 | Seita et al. |
| 5,096,574 A | 3/1992 | Birdsong et al. |
| 5,096,584 A | 3/1992 | Reddy |
| 5,104,532 A | 4/1992 | Thompson et al. |
| 5,108,604 A | 4/1992 | Robbins |
| 5,114,582 A | 5/1992 | Sandstrom |
| 5,128,035 A | 7/1992 | Clack et al. |
| 5,131,277 A | 7/1992 | Birdsong et al. |
| 5,132,017 A | 7/1992 | Birdsong et al. |
| 5,145,575 A | 9/1992 | Burrows |
| 5,167,786 A | 12/1992 | Eberle |
| 5,167,826 A | 12/1992 | Eaton |
| 5,183,567 A | 2/1993 | Mohn et al. |
| 5,194,156 A | 3/1993 | Tomchak |
| 5,198,110 A | 3/1993 | Hanai et al. |
| 5,204,002 A | 4/1993 | Belfort et al. |
| 5,232,591 A | 8/1993 | Solomon |
| 5,234,583 A | 8/1993 | Cluff |
| 5,240,612 A | 8/1993 | Grangeon et al. |
| 5,275,726 A | 1/1994 | Feimer |
| 5,279,732 A | 1/1994 | Edens |
| 5,296,148 A | 3/1994 | Colangelo et al. |
| 5,354,464 A | 10/1994 | Slovak et al. |
| 5,362,383 A | 11/1994 | Zimmerman et al. |
| 5,462,414 A | 10/1995 | Permar |
| 5,466,366 A | 11/1995 | Chia-ching |
| 5,468,387 A | 11/1995 | Solomon |
| 5,507,943 A | 4/1996 | Labrador |
| RE35,252 E | 5/1996 | Clack et al. |
| 5,545,320 A | 8/1996 | Heine et al. |
| 5,573,662 A | 11/1996 | Abe et al. |
| 5,597,487 A | 1/1997 | Vogel et al. |
| 5,626,752 A | 5/1997 | Mohn et al. |
| 5,626,758 A | 5/1997 | Belfort |
| 5,628,198 A | 5/1997 | Permar |
| 5,681,459 A | 10/1997 | Bowman |
| 5,681,467 A | 10/1997 | Solie et al. |
| 5,788,858 A | 8/1998 | Acernese et al. |
| 5,795,475 A | 8/1998 | Luedke et al. |
| 5,811,251 A | 9/1998 | Hirose et al. |
| 5,824,217 A | 10/1998 | Pearl et al. |
| 5,914,041 A | 6/1999 | Chancellor |
| 5,944,985 A | 8/1999 | Bowman |
| 5,985,146 A | 11/1999 | Knappe et al. |
| 6,030,535 A | 2/2000 | Hayashi et al. |
| 6,071,404 A | 6/2000 | Tsui |
| 6,071,414 A | 6/2000 | Kishi |
| 6,099,735 A | 8/2000 | Kelada |
| 6,109,029 A | 8/2000 | Vowles et al. |
| 6,110,360 A | 8/2000 | Hart, Jr. |
| 6,117,297 A | 9/2000 | Goldstein |
| 6,120,682 A | 9/2000 | Cook |
| 6,126,833 A | 10/2000 | Stobbe et al. |
| 6,174,437 B1 | 1/2001 | Haney |
| 6,190,557 B1 | 2/2001 | Hisada et al. |
| 6,193,879 B1 | 2/2001 | Bowman |
| 6,197,191 B1 | 3/2001 | Wobben |
| 6,217,773 B1 | 4/2001 | Graham |
| 6,258,270 B1 | 7/2001 | Hilgendorff et al. |
| 6,277,282 B1 * | 8/2001 | Kihara ............... B01D 63/087 210/321.74 |
| 6,299,766 B1 | 10/2001 | Permar |
| 6,345,961 B1 | 2/2002 | Oklejas, Jr. |
| 6,348,148 B1 | 2/2002 | Bosley |
| 6,379,518 B1 | 4/2002 | Osawa et al. |
| 6,379,548 B1 | 4/2002 | Kurokawa et al. |

(56) References Cited

U.S. PATENT DOCUMENTS

| | | |
|---|---|---|
| 6,383,384 B1 | 5/2002 | Anderson |
| RE37,759 E | 6/2002 | Belfort |
| 6,402,956 B1 | 6/2002 | Andou et al. |
| 6,423,212 B1 | 7/2002 | Bosko |
| 6,423,223 B1 | 7/2002 | Northcut et al. |
| 6,432,301 B1 | 8/2002 | Dengler |
| 6,436,282 B1 | 8/2002 | Gundrum et al. |
| 6,447,259 B2 | 9/2002 | Elliott-Moore |
| 6,514,398 B2 | 2/2003 | DiMascio et al. |
| 6,521,124 B2 | 2/2003 | Northcut et al. |
| 6,521,127 B1 | 2/2003 | Chancellor |
| 6,524,478 B1 | 2/2003 | Heine et al. |
| 6,540,915 B2 | 4/2003 | Patil |
| 6,575,308 B1 | 6/2003 | Fuls et al. |
| 6,579,451 B1 | 6/2003 | Avero |
| 6,607,668 B2 | 8/2003 | Rela |
| 6,613,231 B1 | 9/2003 | Jitariouk |
| 6,632,357 B1 | 10/2003 | Barger et al. |
| 6,790,345 B2 | 9/2004 | Broussard |
| 6,805,796 B2 | 10/2004 | Hirose et al. |
| 6,830,683 B2 | 12/2004 | Gundrum et al. |
| 6,866,831 B2 | 3/2005 | Nakao et al. |
| 6,929,743 B2 | 8/2005 | Diel |
| 6,929,748 B2 | 8/2005 | Avijit et al. |
| 7,021,667 B2 | 4/2006 | Campbell et al. |
| 7,186,331 B2 | 3/2007 | Maartens et al. |
| 7,244,357 B2 | 7/2007 | Herrington et al. |
| 7,297,268 B2 | 11/2007 | Herrington et al. |
| 7,306,437 B2 | 12/2007 | Hauge |
| 7,311,831 B2 | 12/2007 | Bradford et al. |
| 7,351,335 B2 | 4/2008 | Broens et al. |
| 7,387,725 B2 | 6/2008 | Choi et al. |
| 7,416,666 B2 | 8/2008 | Gordon |
| 7,449,093 B2 | 11/2008 | Dudziak et al. |
| 7,455,778 B2 | 11/2008 | Gordon |
| 7,501,064 B2 | 3/2009 | Schmidt et al. |
| 7,514,010 B2 | 4/2009 | Salmon |
| 7,520,981 B2 | 4/2009 | Barber |
| 7,540,956 B1 | 6/2009 | Kurth et al. |
| 7,650,805 B2 | 1/2010 | Nauseda et al. |
| 7,733,459 B2 | 6/2010 | Dierichs et al. |
| 7,736,503 B2 | 6/2010 | Kennedy et al. |
| 7,862,723 B2 | 1/2011 | Cartwright |
| 7,875,184 B2 | 1/2011 | Parker et al. |
| 7,892,429 B2 | 2/2011 | Oklejas, Jr. |
| 7,901,580 B2 | 3/2011 | Salyer |
| 7,909,998 B2 | 3/2011 | Kennedy et al. |
| 7,910,004 B2 | 3/2011 | Cohen et al. |
| 7,927,082 B2 | 4/2011 | Haudenschild |
| 7,981,293 B2 | 7/2011 | Powell |
| 8,021,550 B2 | 9/2011 | Beauchamp et al. |
| 8,101,074 B2 | 1/2012 | Larsen |
| 8,114,286 B2 | 2/2012 | Kawakami |
| 8,147,699 B2 | 4/2012 | Goldsmith |
| 8,257,594 B2 | 9/2012 | Astle et al. |
| 8,282,823 B2 | 10/2012 | Acernese et al. |
| 8,292,088 B2 | 10/2012 | Francisco et al. |
| 8,292,492 B2 | 10/2012 | Ho et al. |
| 8,414,767 B2 | 4/2013 | Gaignet et al. |
| 8,425,734 B2 | 4/2013 | Goel et al. |
| 8,454,829 B2 | 6/2013 | Yaeger |
| 8,506,685 B2 | 8/2013 | Taylor et al. |
| 8,518,225 B2 | 8/2013 | Sumita et al. |
| 8,628,642 B2 | 1/2014 | Goel et al. |
| 8,652,326 B2 | 2/2014 | Johann et al. |
| 8,685,252 B2 | 4/2014 | Vuong et al. |
| 8,696,904 B2 | 4/2014 | Thiyagarajan et al. |
| 8,771,510 B2 | 7/2014 | Takahashi et al. |
| 8,778,055 B2 | 7/2014 | Taylor et al. |
| 8,808,538 B2 | 8/2014 | Oklejas, Jr. |
| 8,889,009 B2 | 11/2014 | Brausch et al. |
| 8,944,257 B2 | 2/2015 | Eisen et al. |
| 8,961,790 B2 | 2/2015 | Beauchamp et al. |
| 8,968,566 B2 | 3/2015 | Beauchamp et al. |
| 8,999,162 B2 | 4/2015 | Vuong et al. |
| 9,011,664 B2 | 4/2015 | Takahashi et al. |
| 9,011,688 B2 | 4/2015 | Takahashi et al. |
| 9,108,162 B2 | 8/2015 | Takahashi et al. |
| 9,114,365 B2 | 8/2015 | Schmitt |
| 9,260,325 B2 | 2/2016 | Takahashi et al. |
| 9,328,743 B2 | 5/2016 | Hirosawa et al. |
| 9,387,445 B2 | 7/2016 | Kimura et al. |
| 9,403,125 B2 | 8/2016 | Shaffer |
| 9,475,008 B2 | 10/2016 | Salama et al. |
| 9,492,792 B2 | 11/2016 | Tomescu et al. |
| 9,546,671 B2 | 1/2017 | Hirosawa et al. |
| 9,597,640 B2 | 3/2017 | Koiwa et al. |
| 9,616,390 B2 | 4/2017 | Hirozawa et al. |
| 9,617,172 B1 | 4/2017 | Baski |
| 9,724,646 B2 | 8/2017 | Okamoto et al. |
| 9,731,984 B2 | 8/2017 | Beall |
| 9,758,389 B2 | 9/2017 | Rau, III |
| 9,764,291 B2 | 9/2017 | Hirozawa et al. |
| 2004/0045892 A1 | 3/2004 | De La Cruz |
| 2006/0011544 A1 | 1/2006 | Sharma |
| 2006/0191837 A1* | 8/2006 | Heinen ............... B01D 61/18 210/321.6 |
| 2007/0095756 A1 | 5/2007 | Hardwicke |
| 2016/0008763 A1 | 1/2016 | Roderick et al. |
| 2019/0030488 A1 | 1/2019 | Roderick |

FOREIGN PATENT DOCUMENTS

| | | | |
|---|---|---|---|
| WO | WO2010047360 A1 | 4/2010 | |
| WO | WO-2014134229 A1 * | 9/2014 | ............ B01D 63/10 |
| WO | WO2015016253 A1 | 2/2015 | |
| WO | WO2017087461 A1 | 5/2017 | |
| WO | WO2018094288 | 5/2018 | |
| WO | WO2018190937 | 10/2018 | |
| WO | WO2018194911 | 10/2018 | |
| WO | WO2018195367 | 10/2018 | |

* cited by examiner

PERMEATE FLOW PATERNS

CROSS-REFERENCE TO RELATED APPLICATIONS

This application is a national stage application under 35 U.S.C. 371 of PCT application PCT/US2017/052116 filed 18 Sep. 2017, which claims priority to U.S. provisional application 62/397,142, filed 20 Sep. 2016. Each of the foregoing is incorporated by reference herein.

The present invention is related to that described in U.S. provisional 61/771,041, filed Feb. 28, 2013, and PCT/IB2014/060705, which are incorporated herein by reference.

BACKGROUND

Field of the Invention

The subject invention relates to a permeable membrane system utilized for the separation of fluid components, specifically spiral-wound membrane permeable membrane elements.

Description of Related Art

Spiral-wound membrane filtration elements well known in the art consist of a laminated structure comprised of a membrane sheet sealed to or around a porous permeate spacer which creates a path for removal of the fluid passing through the membrane to a central tube, while this laminated structure is wrapped spirally around the central tube and spaced from itself with a porous feed spacer to allow axial flow of the fluid through the element. While this feed spacer is necessary to maintain open and uniform axial flow between the laminated structure, it is also a source of flow restriction and pressure drop within the axial flow channel and also presents areas of restriction of flow and contact to the membrane that contribute significantly to membrane fouling via biological growth, scale formation, and particle capture. In pressure retarded osmosis (PRO), forward osmosis (FO), and reverse osmosis (RO) applications, flow paths in the feed spaces and the permeate spacer can be beneficial to optimal system operation.

Improvements to the design of spiral wound elements have been disclosed by Barger et al. and Bradford et al., which replace the feed spacer with islands or protrusions either deposited or embossed directly onto the outside or active surface of the membrane. This configuration is advantageous in that it maintains spacing for axial flow through the element while minimizing obstruction within the flow channel. It also eliminates the porous feed spacer as a separate component, thus simplifying element manufacture. Patent publication number US2016-0008763-A1, incorporated herein by reference, entitled Improved Spiral Wound Element Construction teaches the application of printed patterns on the back side of the active surface of the membrane sheet, or directly on the surface of the permeate spacer.

The following references, each of which is incorporated herein by reference, can facilitate understanding of the invention: U.S. Pat. Nos. 3,962,096; 4,476,022; 4,756,835; 4,834,881; 4,855,058; 4,902,417; 4,861,487; 6,632,357; and US application 2016-0008763-A1.

DESCRIPTION OF THE INVENTION

In some spiral-wound membrane separation applications which involve serial flow through the permeate spacer layer of successive elements such as in the PRO patent listed above, it is advantageous to have lower resistance to flow than what is exhibited by traditional woven permeate spacer fabrics, while maintaining other characteristics including resistance to deformation under high external pressure. Additionally, the ability to tailor flow channels of arbitrary shape within the permeate spacer can allow for controllable distribution of flow through the permeate spacer layer. Embodiments of the present invention provide features printed, deposited onto or integrated into the porous permeate spacer to create positive feed channels in the permeate spacer. In additional example embodiments, the material creating the channels can comprise photopolymers, hot melt polyolefins, curable polymers or adhesives, or other materials.

MODES FOR CARRYING OUT THE INVENTION AND INDUSTRIAL APPLICABILITY

Figure 1:
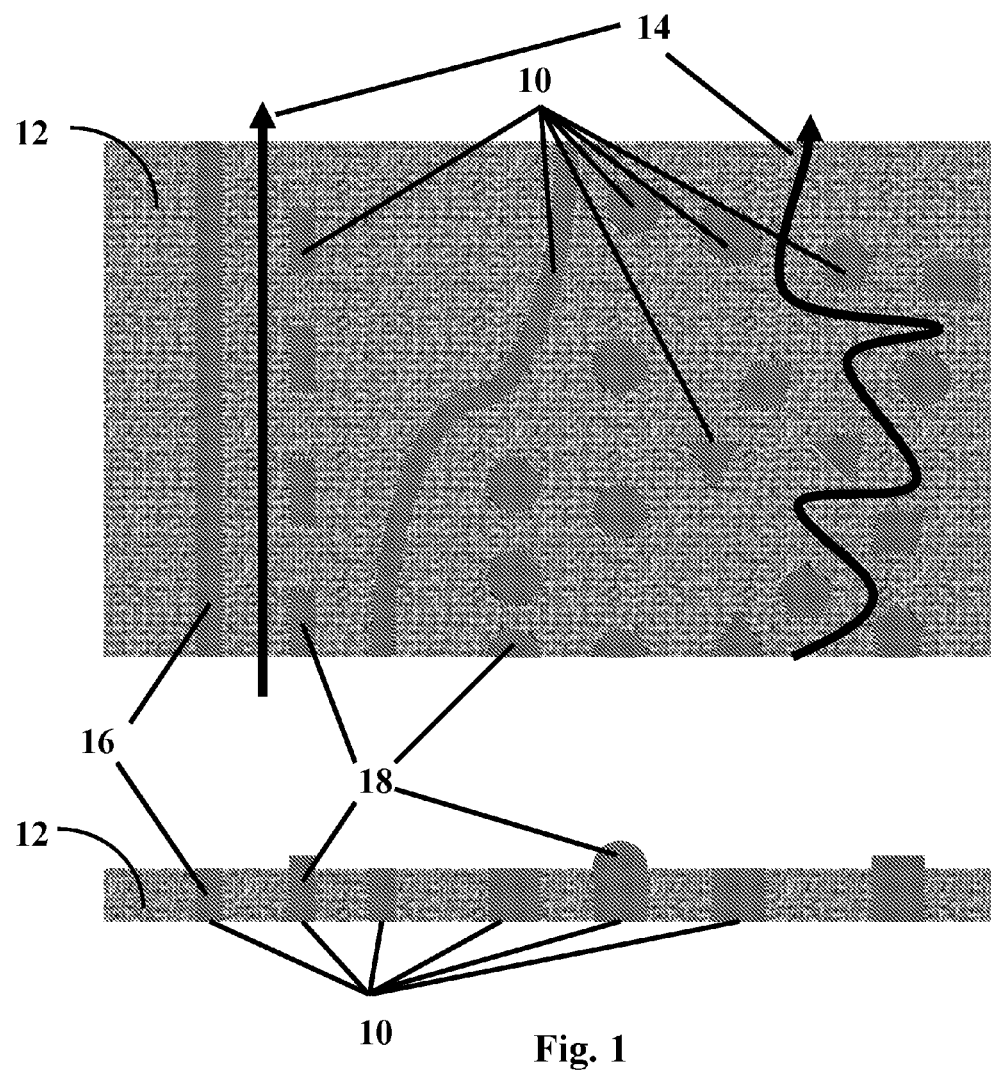
FIG. 1 shows a top view and a side view of a variety of features printed into the interstitial space of a permeate spacer mesh and of features printed both into and on top of the mesh.
Figure 2:
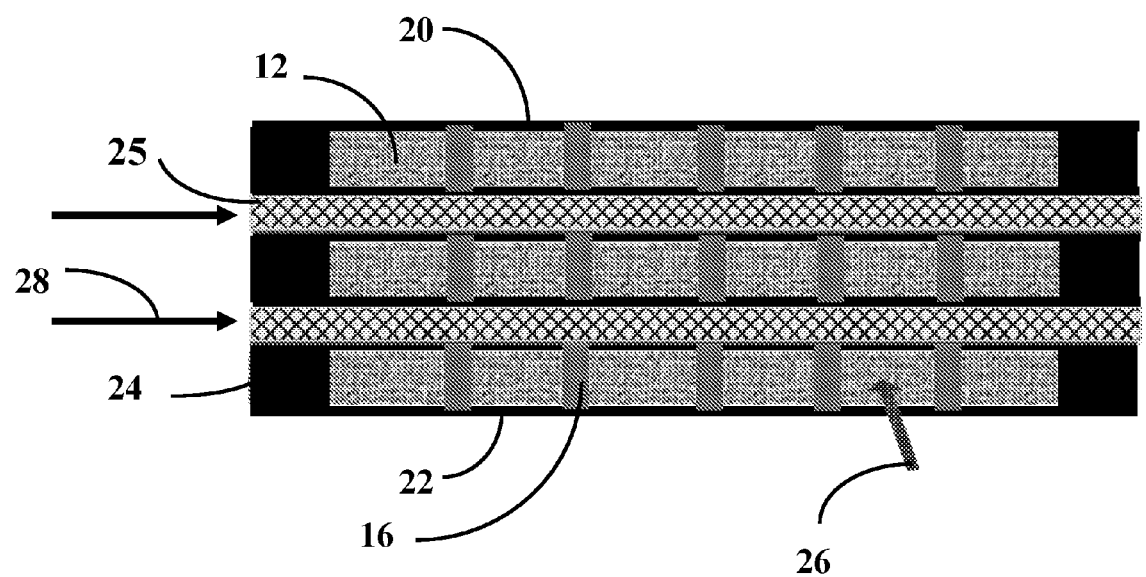
FIG. 2 is a cross section view of a 3D printed material in the interstitial space of a permeate spacer with conventional feed spacer between the adjacent layers.
Figure 3:
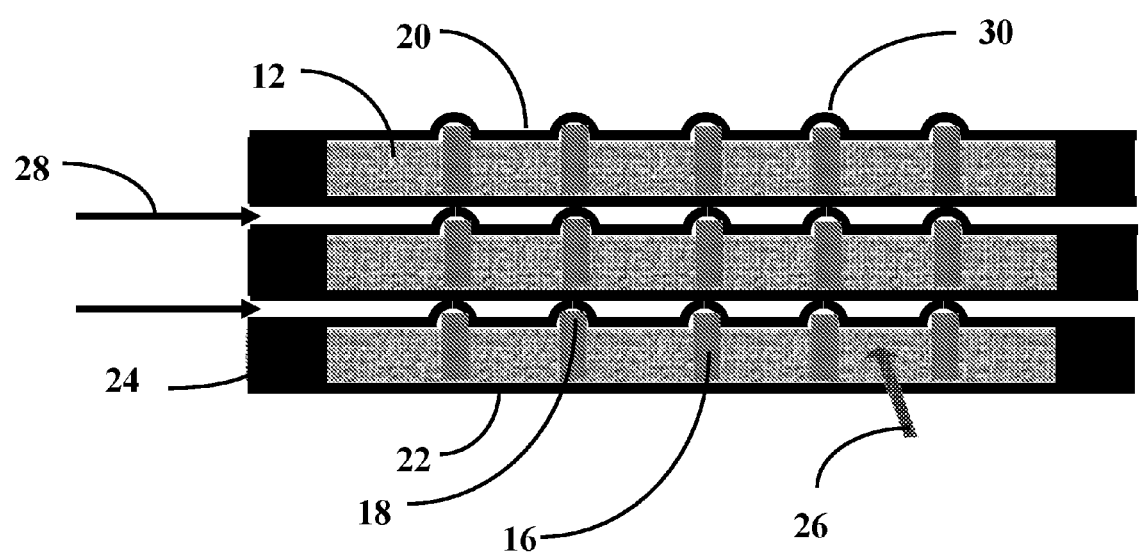
FIG. 3 is a cross section view of a 3D printed material in the interstitial space and protruding above the permeate spacer which embosses the membrane sheet to form a flow channel in place of the conventional feed spacer.
Figure 4:
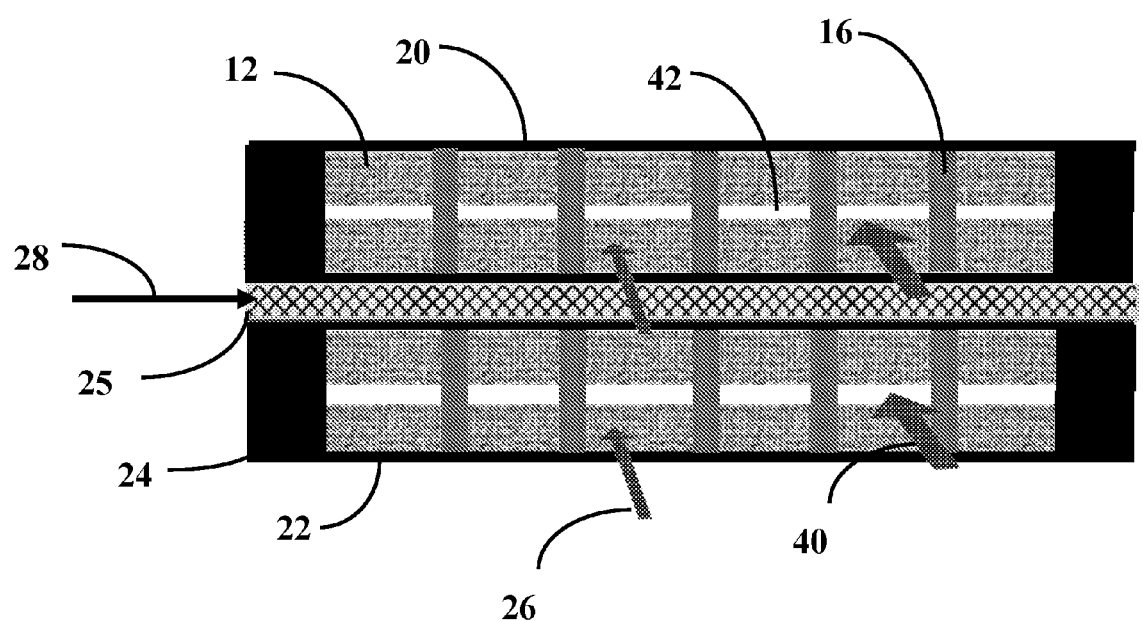
FIG. 4 is a cross section view of a 3D printed material in the interstitial space and protruding through the permeate spacer between two sandwiched sheets of feed spacer producing a more free flow path between the adjacent permeate spacer sheets with conventional feed spacer between the adjacent layers.
Figure 5:
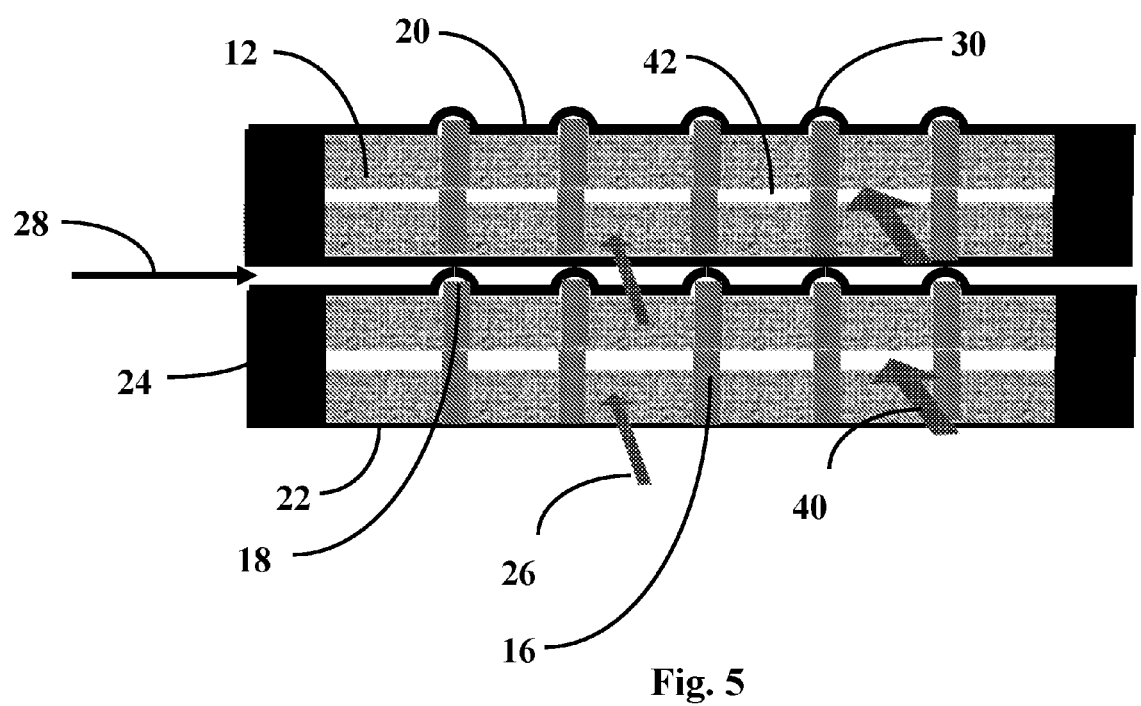
FIG. 5 is a cross section view of a 3D printed material in the interstitial space and protruding above the permeate spacer between two sandwiched sheets of feed spacer producing a more free flow path between the adjacent permeate spacer sheets. The protrusions adjacent to the membrane sheet emboss the membrane to form a flow channel in place of the conventional feed spacer.

Referring initially to FIG. 1, a single deposited feature or plurality of deposited features 10 such as posts, islands, straight, curved, or angled line segments or continuous lines, or other complex shapes can be deposited into 16 or through and onto the surface of the permeate spacer mesh 12 or printed or otherwise applied into the interstitial spaces of the permeate spacer to create arbitrary flow paths 14 in the permeate spacer, or can be introduced into the permeate spacer during the manufacturing process of the porous permeate spacer layer. The flow channels created in the permeate spacer can also incorporate features protruding above the surface of the permeate spacer to create protrusions on top of the permeate spacer 18. As shown in FIG. 3, such protrusions can be used to act to emboss 30 the surface of the membrane sheet adjacent to the permeate spacer 20 to create a separation between the membrane and spacer with the flat bottom membrane 22 of the adjacent layer. They can be used to direct flow 26 through the permeate carrier mesh and can also be used as a spacer between adjacent stacked sheets of permeate spacer to provide lower resistance to fluid flow 40 through this permeate spacer stacked layer, as shown in FIG. 4. Additionally a thicker two-layer permeate spacer can be produced by stacking one layer with features printed in or through and above the spacer on top of a layer of permeate spacer that has features printed through and above it to create interstitial spaces 42 to allow significantly freer flow through these spaces between the permeate spacer than flow through the permeate spacer mesh itself, as shown in FIG. 4 and FIG. 5.

Figure 6:
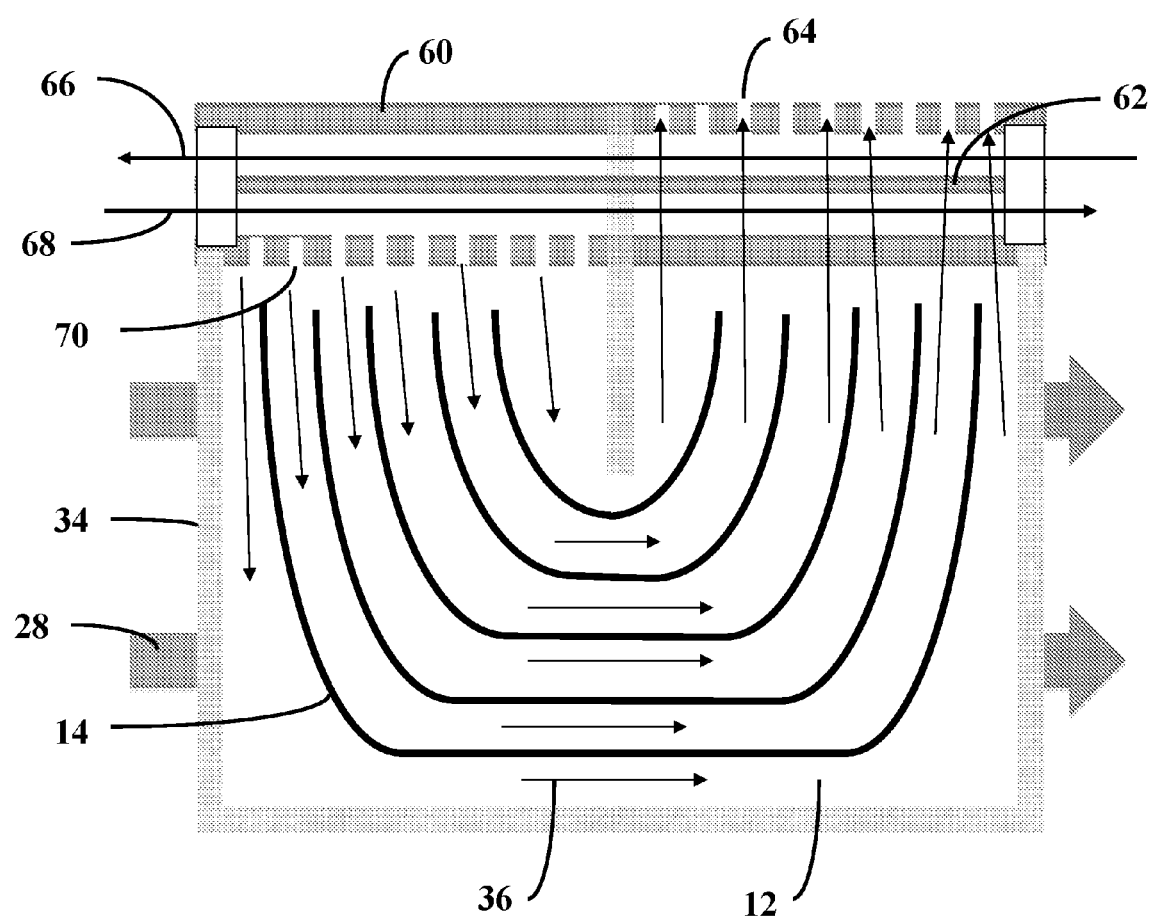
FIG. 6 is a view of flow control features deposited in to the interstitial spaces of a permeate spacer within a spiral-wound PRO membrane element.

Referring to FIG. 6, in some designs of a spiral wound PRO element, a center tube 60 containing a flow separator 62 facilitates liquid flow from the inlet flow 68 through inlet holes 70 into the permeate spacer mesh. The printed features are used to direct and regulate flow through the permeate spacer to optimize flow and mass transfer between the liquid within the permeate spacer and the cross flow feed before the returning permeate flow returns through the outlet holes in the center tube 64 and joins the outlet flow from the center tube 66. In cases where two layers of spacer mesh are used separated by raised features on one layer, the spaces between the layers will create pathways of low resistance to flow, and thus lower pressure drop along the pathways, while still allowing adequate flow through the permeate spacer to the membrane surface to provide adequate mass transfer.

In an example embodiment the deposited features are used to form arbitrary flow paths through the permeate spacer and a conventional feed spacer mesh is used to separate the adjacent layers within the spiral wound element.

In an example embodiment the deposited features are used to form arbitrary flow paths through the permeate spacer and the embossed features create spaces in the brine feed channel that otherwise replace feed spacer mesh material that is currently used in the art of fabricating spiral wound membrane elements.

In an example embodiment two layers of permeate spacer are stacked on top of one another instead of using a single layer with the deposited features forming arbitrary flow paths through the permeate spacer and the protrusions deposited on one or both layers create a space between the layers that creates significantly lower resistance to fluid flow than the permeate spacer material itself while a conventional feed spacer mesh is used to separate the adjacent layers within the spiral wound element.

In an example embodiment two layers of permeate spacer are stacked on top of one another instead of using a single layer with the deposited features forming arbitrary flow paths through the permeate spacer and the protrusions deposited on one or both layers create a space between the layers that creates significantly lower resistance to fluid flow than the permeate spacer material itself while the embossed features create spaces in the brine feed channel that otherwise replace feed spacer mesh material that is currently used in the art of fabricating spiral wound membrane elements.

The height and shape of the features can be configured to provide flow paths within the permeate spacer and spacing for embossed or protruding features appropriate to free flow in their respective flow regimes. The features do not need to be entirely solid and can contain some degree of permeability, depending on the printing materials and techniques used. Some amount of permeability can be acceptable because the patterns are made to direct flow but do not need to entirely separate flow. A small amount of flow or diffusion across the patterns that do not substantially affect bulk flow can be acceptable in some applications.

Those skilled in the art appreciate that the features can be comprised of various materials that are compatible with the separated fluid and the permeate spacer including, but not limited to, thermoplastics, reactive polymers, waxes, or resins. Additionally, materials that are compatible with the separated fluid but not compatible with direct deposition to the permeate spacer, including, but not limited to high-temperature thermoplastics, metals, or ceramics, can be pre-formed, cast, or cut to the proper dimensions and adhered to the surface of the permeate spacer with an adhesive that is compatible with the permeate spacer.

Those skilled in the art appreciate that the features can be deposited by a variety of techniques. Traditional printing techniques such as offset printing, gravure printing, and screen printing, can be suitable, although there can be thickness and geometry limitations with these deposition techniques. Thicker features can be deposited by microdispensing, inkjet printing, fused deposition, or via application using an adhesive that can include roll transfer of sheet or pick-and-place of individual features.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those skilled in the art.

We claim:

1. An assembly comprising:
    (a) a first permeate spacer layer, comprising a first material having a first permeability, and having a first plurality of features comprising a second material having a second permeability, disposed within the first permeate spacer layer extending from a first surface of the first permeate spacer layer, through the thickness of the first permeate spacer layer, and above a second surface of the first permeate spacer layer by a distance, where the first surface is opposite the second surface, wherein the first plurality of features provide flow paths within the first permeate spacer layer, and wherein the second permeability is less than the first permeability;
    (b) a membrane, disposed adjacent to the second surface of the first permeate spacer layer such that the first plurality of features emboss the membrane;
    (c) a second permeate spacer layer, comprising the first material, and having a second plurality of features comprising the second material, disposed within the second permeate spacer layer extending from a first surface of the second permeate spacer layer and through the thickness of the second permeate spacer layer;
    wherein the first plurality of features extend beyond the first surface of the first permeate spacer layer, the second plurality of features extend beyond the first surface of the second permeate spacer layer, or both; and
    wherein the second permeate spacer layer is disposed adjacent the first permeate spacer layer such that the first plurality of spacers, the second plurality of spacers, or both space the first surface of the second permeate spacer layer apart from the first surface of the first permeate spacer layer.

2. A reverse osmosis filter element comprising an assembly as in claim 1 spirally wound about a central fluid flow channel.

3. A method of making a reverse osmosis filter comprising making an assembly as in claim 1, and spirally winding the assembly about a central fluid flow channel.

4. A method of producing an assembly, comprising:
(a) providing a first permeate spacer layer comprising a first material having a first permeability;
(b) depositing a plurality of features comprising a second material, having a second permeability, into the first permeate spacer layer, wherein the features extend from a first surface of the first permeate spacer layer, through the thickness of the first permeate spacer layer, and above a second surface of the first permeate spacer layer by a distance, where the first surface is opposite the second surface, wherein the first plurality of features provide flow paths within the first permeate spacer layer, and wherein the permeability of the second material is less than the permeability of the first material;
(c) providing a membrane;
(d) placing the membrane adjacent the second surface of the first permeate spacer layer such that the first plurality of features emboss the membrane;
(e) providing a second permeate spacer layer, comprising the first material;
(f) depositing a second plurality of features comprising the second material into the second permeate spacer layer, wherein the features extend from a first surface of the second permeate spacer layer and through the thickness of the second permeate spacer layer;
(g) wherein the first plurality of features extend beyond the first surface of the first permeate spacer layer, the second plurality of features extend beyond the first surface of the second permeate spacer layer, or both;
(h) placing the second permeate spacer layer adjacent the first permeate spacer layer such that the first plurality of spacers, the second plurality of spacers, or both space the first surface of the second permeate spacer layer apart from the first surface of the first permeate spacer layer.

* * * * *